(12) United States Patent
Bauer et al.

(10) Patent No.: US 11,598,351 B2
(45) Date of Patent: Mar. 7, 2023

(54) HYDRAULIC ACCUMULATOR

(71) Applicant: HYDAC TECHNOLOGY GMBH, Sulzbach/Saar (DE)

(72) Inventors: Frank Bauer, Marpingen (DE); Peter Kloft, Ransbach-Baumbach (DE)

(73) Assignee: HYDAC TECHNOLOGY GMBH, Sulzbach/Saar (DE)

( * ) Notice: Subject to any disclaimer, the term of this patent is extended or adjusted under 35 U.S.C. 154(b) by 0 days.

(21) Appl. No.: 17/256,338

(22) PCT Filed: Jun. 14, 2019

(86) PCT No.: PCT/EP2019/065672
§ 371 (c)(1),
(2) Date: Dec. 28, 2020

(87) PCT Pub. No.: WO2020/002004
PCT Pub. Date: Jan. 2, 2020

(65) Prior Publication Data
US 2021/0222708 A1  Jul. 22, 2021

(30) Foreign Application Priority Data
Jun. 29, 2018 (DE) .................... 10 2018 005 204.5

(51) Int. Cl.
*F15B 1/24* (2006.01)
*G02B 7/00* (2021.01)

(52) U.S. Cl.
CPC .......... *F15B 1/24* (2013.01); *F15B 2201/205* (2013.01); *F15B 2201/31* (2013.01);
(Continued)

(58) Field of Classification Search
CPC ............................. F15B 2201/50; G02B 7/007
(Continued)

(56) References Cited

U.S. PATENT DOCUMENTS 1,189,922 A * 7/1916 Daly ....................... G01F 23/02
220/663
1,264,143 A * 4/1918 Bennett .................. B65D 90/48
33/721

(Continued)

FOREIGN PATENT DOCUMENTS

CH      510 842     7/1971
DE    1 940 244     2/1971
(Continued)

OTHER PUBLICATIONS

METAGLAS Metal Fused Sight Glasses. Catalog [PDF], Herberts Industrieglas GmbH, 2015 [retrieved on Jan. 29, 2022], Retrieved from the Internet: <URL:https://www.metaglas.de/fileadmin/dokumente/pdf/Datenblätter%202015/Englisch/Metaglas%20Prospekt%20Englisch%2021-05-2015_ENGLISCH_online_edition.pdf> (Year: 2015).*

(Continued)

*Primary Examiner* — Kenneth Rinehart
*Assistant Examiner* — Richard K. Durden
(74) *Attorney, Agent, or Firm* — Wenderoth, Lind & Ponack, L.L.P.

(57) ABSTRACT

A hydraulic accumulator, in particular in the form of a piston accumulator, has an accumulator housing (10) and a separating element (20) arranged in the housing. The separating element is in the form of a piston, which separates a fluid side (22) from a gas side (24). At least the gas side (24) can be inspected, at least in part, by at least one sight glass (34, 36) that is fixed in the accumulator housing (10).

18 Claims, 1 Drawing Sheet

(52) U.S. Cl.
CPC ... *F15B 2201/405* (2013.01); *F15B 2201/415* (2013.01); *F15B 2201/50* (2013.01); *G02B 7/007* (2013.01)

(58) Field of Classification Search
USPC .................. 73/323; 116/276; 220/602, 663; 33/DIG. 15
See application file for complete search history.

(56) References Cited

U.S. PATENT DOCUMENTS

| | | | | | |
|---|---|---|---|---|---|
| 1,630,335 | A | * | 5/1927 | Ford | F25B 41/006 116/276 |
| 2,744,487 | A | * | 5/1956 | Moore | F25B 41/006 73/323 |
| 4,055,105 | A | * | 10/1977 | Wiese | F41A 25/20 33/DIG. 15 |
| 4,064,826 | A | * | 12/1977 | Pauli | F25B 41/006 116/276 |
| 4,730,465 | A | * | 3/1988 | Inoue | F25B 43/006 62/503 |
| 4,738,064 | A | * | 4/1988 | Aarts | G02B 7/007 52/204.5 |
| 4,806,707 | A | * | 2/1989 | Landmeier | G06F 3/038 250/230 |
| 4,807,474 | A | * | 2/1989 | Foster | B01J 3/004 116/276 |
| 4,961,628 | A | * | 10/1990 | Herberts | E06B 5/12 359/894 |
| 6,359,742 | B1 | * | 3/2002 | Canty | B01J 3/004 220/663 |
| 6,484,620 | B2 | * | 11/2002 | Arshad | G01S 17/10 91/1 |
| 2008/0179333 | A1 | | 7/2008 | Fuller et al. | |
| 2011/0073199 | A1 | * | 3/2011 | Stocker, Jr | F16K 24/06 137/526 |
| 2016/0258449 | A1 | * | 9/2016 | Lehnert | F15B 1/103 |
| 2018/0045229 | A1 | * | 2/2018 | Jackan | F15B 15/2876 |

FOREIGN PATENT DOCUMENTS

| | | |
|---|---|---|
| DE | 42 27 657 | 2/1994 |
| DE | 10 2014 001 283 | 8/2015 |
| FR | 2 529 290 | 12/1983 |
| WO | 2009/091621 | 7/2009 |

OTHER PUBLICATIONS

Duplex 2205 Specifications: UNS 32205/S31803. Datasheet [PDF], Penn Stainless Products, Inc., 2013. Retrieved from Internet Archive Wayback Machine <URL: https://web.archive.org/web/20130718102909/http://www.pennstainless.com/images/DS-Duplex-2205.pdf> on Jul. 21, 2022 (Year: 2013).*

International Search Report (ISR) dated Aug. 16, 2019 in International (PCT) Application No. PCT/EP2019/065672.

* cited by examiner

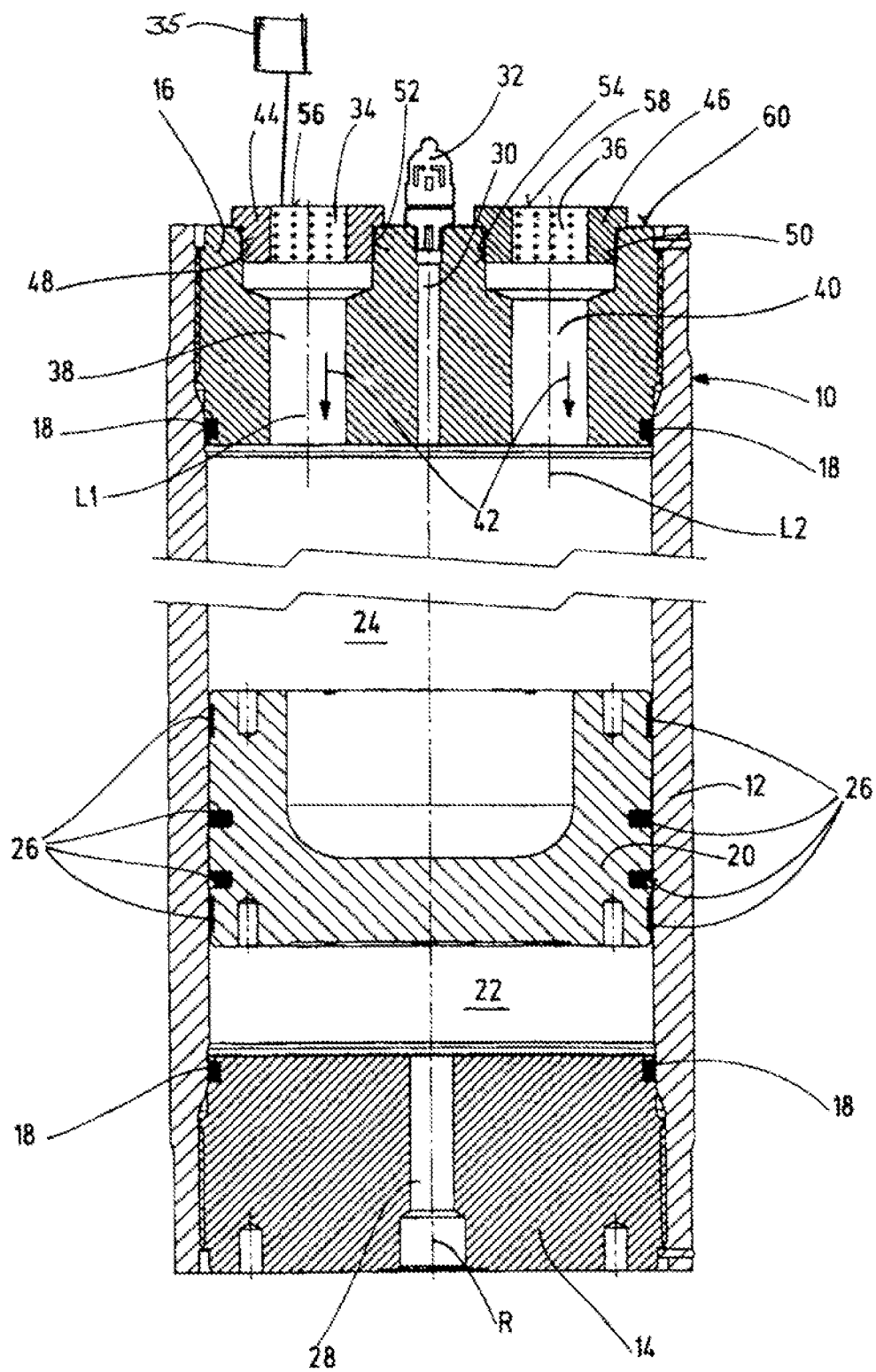

HYDRAULIC ACCUMULATOR

FIELD OF THE INVENTION

The invention relates to a hydraulic accumulator, in particular in the form of a piston accumulator, comprising an accumulator housing and a separating element arranged therein. In particular, the separating element is in the form of a piston separating a fluid side from a gas side.

BACKGROUND OF THE INVENTION

Accumulators, also called gas pressure accumulators, are also called piston accumulators, bladder accumulators, diaphragm accumulators and bellows accumulators, depending on the separating element used to separate a gas side from a liquid side in the accumulator housing. The hydraulic accumulators mentioned have, at least before they are connected to their respective fluid circuit, a pre-determinable pressure setpoint value on the gas side. The pressure setpoint value is also referred to as the accumulator gas preload.

If the separator element fails, liquid will transfer from the liquid side to the gas side of the accumulator, resulting in a loss of gas preload and regularly rendering the hydraulic accumulator unusable.

In order to detect this case of failure, DE 42 27 657 A1 proposes a device for checking a predeterminable setpoint position of a piston, which piston can be moved within the accumulator housing, as a separating element. The accumulator housing on one side of the separating element is filled with gas, and the other side can be connected to a fluid circuit. The setpoint position is related to the predeterminable gas preload. In the known solution, the separating piston has a testing body, to which a visible marking identifying the setpoint position of the separating element on the outside of the accumulator housing has been assigned. In relation to the marking, an ultrasonic testing device, provided for the respective testing body, can be placed on the accumulator. If, during subsequent operation and when checked again by the ultrasonic testing device, the current position of the separating piston deviates from the setpoint position of the separating piston, wherein the setpoint position matches a predeterminable gas preload, this deviation indicates that the hydraulic accumulator is no longer working properly.

A further monitoring device for hydraulic accumulators is known from DE 10 2014 001 283 A1. Whereas in the above-mentioned state of the art, the operating situation of the hydraulic accumulator can only be tested based on the interposition of a testing device having the appropriate sensor technology, the present monitoring device provides a visually recognizable display arranged on the accumulator for the checking. For this purpose, a viewing window is arranged on the wall of the housing as part of the monitoring device. Through this viewing window, an indicator can be observed. The indicator is connected to the gas chamber in a media-conveying manner. The optical properties of the indicator change recognizably when wetted with a liquid, which regularly happens when liquid is unintentionally transferred to the gas side because the separating element fails. By observing the indicator through a pressure-sealed closed viewing window, directly mounted to the accumulator housing, the function can be monitored particularly easily and safely from the outside during operation.

Both monitoring devices have in common that the transfer of liquid from the liquid side of the accumulator to the gas side of the accumulator in the event of a corresponding failure of the separating element is the only failure case that can be detected. However, other cases of damage cannot be detected that way. Neither can any other observation of the condition of the hydraulic accumulator be performed in this way.

SUMMARY OF THE INVENTION

Based on this state of the art, the invention therefore addresses the problem of further improving the known solutions such that other possible sources of malfunctioning and the status of the accumulator can be monitored.

A hydraulic accumulator can basically solve this problem by at least the gas side of the hydraulic accumulator being able to be inspected, at least in part, by at least one sight glass, which is fixed in the accumulator housing. The solution according to the invention does not require the use of complicatedly constructed test devices and does not require an indicator substance due to which, regularly formed as a chemical indicator, the indicator substance changes or possibly even completely loses its response behavior during long-term operation of the hydraulic accumulator. On the other hand, the solution according to the invention permits the permanent visual observation of the inside of the accumulator housing, at least at its gas side.

Because the working gas of a hydraulic accumulator is regularly made of nitrogen gas, which is transparent, observation of the inside of the accumulator housing and into the gas space is in no way impeded. Instead, the gas side of the hydraulic accumulator is freely accessible for optical observation. Not only can the unintentional transfer of liquid via the separating element to the gas side of the accumulator be observed without problem, as in the known solutions, but also a further large number of faults that may occur, such as corrosion, flaking of coatings, the parts broken off or separated from the accumulator housing and the respective separating element, including the seal parts and guide parts that are detached used to guide a separating piston along the inner wall of the accumulator housing during its longitudinal motion can be observed. Particularly when piston accumulators are used as pulsation dampers to smooth out pressure fluctuations at the fluid side, chatter marks or groove marks often appear on the inner wall of the accumulator housing providing information about the remaining service life of the piston accumulator.

Independent of the detection of such faults and defects, the sight glass can also be used to make a visual statement about the condition of the hydraulic accumulator, for example, by looking at the function of the separating element during operation to see whether it is working properly, and thus, without problems. If an elastomeric material is used for the respective separating element (membrane or bladder), a reliability statement can be made about its quality, for example with regard to the porosity of the separating element.

Even if the optical status monitoring is preferably performed on the gas side of the hydraulic accumulator, the fluid side can also be monitored additionally or alternatively, even if the quantity of fluid introduced there impairs optical observation from the outside accordingly. In this way, for example, from the gas side to the liquid side unintentionally transferred gas quantities regularly in the form of bubbles can be detected optically.

If the appropriate sensor technology is used, the accumulator itself can be monitored without the need for maintenance and operating personnel, which also includes the use of camera technology.

Depending on the installation position of the hydraulic accumulator, the respective sight glass can be located on the cover, at the bottom or at a side wall of the accumulator housing. In case of a side arrangement in the accumulator housing, provision must be made that the sight glass inserted in the accumulator housing does not impede the motion of the separator element, for example by ensuring that the sight glass is flush with the inner wall of the accumulator housing, and thus, can be passed over by a separating piston without obstruction. The size of the sight glass is expediently chosen such that the light entering the interior of the accumulator housing through the sight glass is sufficient for inspection.

In a preferred embodiment of the hydraulic accumulator according to the invention, for manufacturing the sight glass, a metal material surrounding the glass material is heated together with the glass material to a temperature at which the glass material is liquid and runs to the metal material while in contact therewith. Upon subsequent cooling, the glass material then solidifies, while forming a sight glass, and is clamped in an annular manner by the metal material. A fluid-sealed installation of the sight glass into the accumulator housing is achieved by forming a material-tight connection between the glass material of the sight glass and the metal material of the accumulator housing or a separate metal ring. This forming results in the advantage that, at the sight glass inserted in a housing opening of the hydraulic accumulator, no fluid, such as gas, can reach the environment of the accumulator housing in an undesired way. Instead of a ring-shaped cross-section, any other outer contour of the sight glass and the associated housing opening is conceivable, e.g. square, triangular, star-shaped, oval or following any free form. A separate metal part between the sight glass and the associated housing opening can be used to form the outer contour of the sight glass independently of the inner contour of the housing opening, for example, to fix a circular sight glass in a rectangular housing opening or vice versa.

Sight glasses fused with a metal are formed essentially of a sight glass melted into a metal ring. Due to the mechanical preload, such a metal-fused sight glass behaves like a tough material and has an increased safety compared to a thermally preloaded sight glass. For the visual control of processes taking place inside the hydraulic accumulator as a closed space, the metal-fused sight glass has the required resistance to pressure, temperature and media loads and the required transparency for viewing.

In a further preferred embodiment of the hydraulic accumulator according to the invention, the metal material includes materials of the accumulator housing or of an independent metal ring, preferably a corrosion-resistant stainless steel, which is inserted into the accumulator housing. The metal ring as a separate component permits the selection of a suitable metal material for the connection to the glass material of the sight glass and a separate production of the metal fused sight glass, which is then inserted into the accumulator housing. It can be installed flush with the outer wall of the accumulator or with a protrusion over the outer wall of the accumulator, comparable to a mounted frame. A frame, protruding outwards beyond the outer wall of the accumulator housing, can be used to protect the sight glass, in particular against dirt particles applied from the side, in addition to the assigned impairment of visual inspection. The advantage of a flush installation of the sight glass or the sight glasses in the outer wall of the accumulator is a smooth, projection-free outer wall of the hydraulic accumulator, which is visually attractive and easy to clean.

It is also advantageous that the sight glass is a laminated safety glass, a soda lime glass, a borosilicate glass, a glass ceramic, or a quartz glass or sapphire glass. This selection permits for the individual application a suitable sight glass to be selected with regard to pressure resistance, temperature resistance, transparency and material resistance to the liquids and gases accommodated in the hydraulic accumulator. In addition to the selected glass material, the size of the housing opening for the sight glass and the thickness of the glass pane are decisive for the quality of the visual inspection and the service life of the sight glass.

In a preferred embodiment of the invention, the exposed front sides of the sight glass are cut and preferably polished. This treatment effectively obviates any restrictions on a visual inspection through the sight glass. Interfering scratches and unevenness are eliminated, and a visually attractive surface, which is easy to clean if necessary, is formed on the front side of the sight glass. The sight glass provides a maintenance-free, optical testing device for monitoring the processes in a hydraulic accumulator, e.g. for monitoring the motion of a piston, in a constructively simple and cost-effective manner.

In a preferred embodiment of the hydraulic accumulator according to the invention, the sight glass is provided with optical properties such as magnification and/or prismatic properties, and/or may have a coating. The optical properties of the sight glass are adjusted to suit requirements to facilitate the visual inspection of the accumulator housing with the separating element located inside. For instance, an appropriate coating increases contrasts between individual components, enlarges and/or distorts views of components and prevents disturbing mirror reflections on the sight glass by anti-reflective coating. The lens can be formed as a fisheye and can produce corresponding distortions when looking through the sight glass into the interior of the accumulator housing. A coating is an anti-reflection coating to suppress the reflection of optical surfaces of lenses, objectives, prisms or plates and to increase transmission. In summary, the sight glass formed according to the invention allows a reliable visual inspection at increased quality.

In another preferred embodiment of the hydraulic accumulator, the metal ring surrounding the sight glass has an outer thread fixing the metal ring to the accumulator housing via an inner thread. The outer thread, interacting with the inner thread, allows a safe installation and a positionally stable arrangement of the sight glass in the assigned housing opening of the accumulator housing.

It is also advantageous that the two sight glasses are fixed in the accumulator housing, of which one sight glasses is used to supply light, preferably from an external light source, and the other sight glass is used for optical observation. By this sight glass arrangement, an illumination of the otherwise unlit interior of the hydraulic accumulator is realized, which facilitates the observation of components as well as their motion and interaction in the interior of the hydraulic accumulator. If two sight glasses are used, they can also have different glass diameters, for example a small sight glass for lighting and a larger one for observation by humans.

Another advantage is that both sight glasses are arranged side by side and are fixed to the accumulator housing such that their longitudinal axes extend in parallel to a longitudinal axis of the accumulator housing. This sight glass arrangement permits a view into the interior of the hydraulic accumulator comparable to binoculars, where each eye of the observer is assigned to a separate glass.

The location of installation of the two sight glasses is preferably an end cover, arranged on the front side, as part of the accumulator housing. Apart from a filler neck, the end cap is usually kept free of any other attachments. This arrangement provides good accessibility for an observer who can bring his eyes close to both sight glasses for visual inspection. Advantageously, the end cover is removeable from the accumulator housing, which permits a possible repair and maintenance of the sight glasses at comparatively little effort.

Depending on the form of its separating element, the hydraulic accumulator is formed in particular as a piston accumulator, bellows accumulator, bladder accumulator or diaphragm accumulator. The at least one sight glass provides an inspection window for monitoring the interior of the accumulator housing.

The above-mentioned features and the further cited features, according to the invention can be implemented individually or in any combination at a hydraulic accumulator.

Other objects, advantages and salient features of the present invention will become apparent from the following detailed description, which, taken in conjunction with the drawings, discloses a preferred embodiment of the present invention.

BRIEF DESCRIPTION OF THE DRAWINGS

Referring to the drawing that forms a part of this disclosure and that is schematic and not to scale:

FIG. 1 is a side view in section of a hydraulic accumulator according to an exemplary embodiment of the invention, having a separating element arranged therein and two sight glasses arranged on the front end of an upper end cover.

DETAILED DESCRIPTION OF THE INVENTION

FIG. 1 shows a longitudinal section of a hydraulic accumulator having an accumulator housing 10, which has a hollow cylindrical main part 12 having a bottom part 14 at the bottom and an end cover 16 at the top. The bottom part 14 and the end cover 16 are inserted into the main part 12 of the accumulator housing 10 from the respective free ends and are sealed against the main part 12 in a fluid-tight manner using sealing elements 18. A separating element 20 is arranged in the accumulator housing 10 and can be moved linearly. The separating element 20 has the shape of a pot-shaped piston, separating a liquid or oil side or chamber 22, assigned to the bottom part 14, from a gas side or chamber 24 assigned to the end cover 16. Furthermore, the separating element 20 has a pot-shaped opening facing the gas side 24. The accumulator housing 10 with the separating element 20 arranged therein is rotationally symmetrical to the longitudinal axis R of the hydraulic accumulator, which longitudinal axis is vertically aligned in the representation of FIG. 1. Due to the large extension of the hydraulic accumulator in the direction of the longitudinal axis R, in the FIGURE the hydraulic accumulator is depicted with an interruption.

To facilitate moving the separating element 20 in the interior of the accumulator housing 10, sliding guides together with sealing rings 26 are formed on the radial outside of the separating element 20. A fluid port 28 is formed in the bottom part 14, and a gas port 30 is formed in the end cover 16, both coaxial to the longitudinal axis R. In the shown functional position of the hydraulic accumulator, the fluid port 28 is open for connection with a fluid line (not shown) to supply fluid to the fluid side 22 or to discharge fluid therefrom. A plug 32 is used to close the gas port 30 after filling the gas side 24 using a specified pressure.

To inspect the interior of the accumulator housing 10 on the gas side 24, a first sight glass 34 and a second sight glass 36 are arranged in a first through hole 38 and in a second through hole 40, respectively, in the end cover 16. As shown by arrows 42, the two sight glasses 34, 36 permit a view of the gas side 24 of the hydraulic accumulator and a monitoring of the position of the separating element 20 in the accumulator housing 10. The sight glasses 34, 36 are each inserted material-fit into a first metal ring 44 and a second metal ring 46, respectively, while forming a viewing glass. For the production of these metal-fused sight glasses 34, 36, a metal ring, surrounding the glass material, is heated together with the sight glasses 34, 36 to a temperature, at which the glass material is liquid and runs to a metal material of the ring while in contact therewith, such that upon subsequent cooling the glass material solidifies, while forming a respective sight glass, and is clamped annularly by the metal material, here the metal rings 44, 46. The metal of the rings and the accumulator housing may be the same or independent (i.e., different).

The metal rings 44, 46, surrounding the respective sight glass 34, 36, are preferably made of a corrosion-resistant stainless steel. Each have an outer thread 48, 50, with which they are each screwed into an inner thread 52, 54 at the outer end of the respective through-holes 38, 40 to secure the sight glasses 34, 36 to the accumulator housing 10. The exposed fronts 56, 58 of the two sight glasses 34, 36 are cut and preferably polished and are flush with the associated metal ring 44, 46. The preferred glass material for the respective sight glass 34, 36 is a laminated safety glass, a soda lime glass, a borosilicate glass, a glass ceramic or a quartz glass or sapphire glass. It is advisable that both sight glasses 34, 36 are made of the same material, but it is also conceivable to choose different glass materials. To improve visibility through the sight glasses 34, 36 and the optical effects produced thereby, they may be provided with optical properties such as magnification, and/or prismatic properties and/or may have a coating providing an increasing contrast property, an enlarging or distorting property and/or an anti-reflective property.

In the exemplary embodiment shown, two sight glasses 34, 36 are fixed in the accumulator housing 10, but it is also conceivable to provide only one or more than two sight glasses 34, 36, which can also be arranged in the main part 12 and in the bottom part 14. The location of the two sight glasses 34, 36 in the embodiment shown is the end cover 16, arranged on the front side, as part of the accumulator housing 10. The two sight glasses 34, 36 protrude in axial direction with a small projection over a cover front side 60 of the end cover 16. The two sight glasses 34, 36 are arranged side-by-side and are fixed to the accumulator housing 10 such that their longitudinal axes L1, L2 extend in parallel to the longitudinal axis R of the accumulator housing. Advantageously, one sight glass 34 is used to supply light, preferably from an extraneous light source 35, and the other sight glass 36 is used simultaneously for optical observation.

The solution according to the invention permits the observation of the gas side 24 in an accumulator housing 10 of a hydraulic accumulator and the separating element 20 arranged therein and further components via one or more sight glasses 34, 36 in a structurally simple, reliable and cost-effective manner. If the respective sight glasses 34, 36 are integrated into screw inserts in the manner of an insert solution. The screw inserts can be produced in large quantities in a standardized construction and can be inserted into existing hydraulic accumulators in operation in the manner of a retrofit kit. At that preferably the metal ring 44, 46, provided with a corresponding outer thread, is used as the insert holder.

While one embodiment has been chosen to illustrate the invention, it will be understood by those skilled in the art that various changes and modifications can be made therein without departing from the scope of the invention as defined in the claims.

The invention claimed is:

1. A hydraulic accumulator, comprising:
    an accumulator housing having a gas chamber and a liquid chamber in the accumulator housing coaxially arranged along a longitudinal axis of the accumulator housing;
    a separating element in the accumulator housing separating the gas chamber from the liquid chamber; and
    first and second sight glasses fixedly mounted in the accumulator housing with the first sight glass arranged to supply light to the separating element in the accumulator housing and with the second sight glass arranged to provide direct optical observation by human inspectors of the separating element in the accumulator housing in directions parallel to and laterally offset from the longitudinal axis, each of the first and second sight glasses having an exposed front surface facing an environment outside of the accumulator housing and extending perpendicular to the longitudinal axis.

2. A hydraulic accumulator according to claim 1 wherein each of the first and second sight glasses comprises an annular metal ring being cylindrical and surrounding a glass material formed by heating the annular metal ring and the glass material together to a temperature at which the glass material is a liquid and flows into contact with the annular metal ring and by subsequently cooling the glass material to solidify the glass material forming the respective sight glass with the glass material clamped in the annular metal ring.

3. A hydraulic accumulator according to claim 2 wherein the accumulator housing is formed of housing metal, the annular metal rings and the housing metal being identical metals.

4. A hydraulic accumulator according to claim 3 wherein the housing metal and the annular metal rings are stainless steel.

5. A hydraulic accumulator according to claim 2 wherein the accumulator housing is formed of a housing metal that is a separately and independently formed part relative to the annular metal ring.

6. A hydraulic accumulator according to claim 2 wherein the annular metal ring is stainless steel.

7. A hydraulic accumulator according to claim 1 wherein each of the first and second sight glasses comprises at least one of a laminated safety glass, a soda lime glass, a borosilicate glass, a glass ceramic, a quartz glass or sapphire glass.

8. A hydraulic accumulator according to claim 1 wherein each of the first and second sight glasses is cut and polished on the front surface located outside of the accumulator housing.

9. A hydraulic accumulator according to claim 1 wherein the second sight glass has optical properties of at least one of a magnification property, a prismatic property or has a coating providing an increasing contrast property, an enlarging or distorting views property or providing an anti-reflective property.

10. A hydraulic accumulator according to claim 1 wherein each of the first and second sight glasses comprises a metal ring surrounding glass material and having an outer thread fixed to a respective inner thread in the accumulator housing.

11. A hydraulic accumulator according to claim 1 wherein the first and second sight glasses are arranged side-by-side in and are fixed to the accumulator housing, with longitudinal axes of the first and second sight glasses extending parallel to the longitudinal axis of the accumulator housing.

12. A hydraulic accumulator according to claim 1 wherein the accumulator housing comprises an end cover on a first side of the accumulator housing, the first and second sight glasses being in the end cover.

13. A hydraulic accumulator according to claim 1 wherein each of the first and second sight glasses has an identical structure.

14. A hydraulic accumulator according to claim 1 wherein the gas chamber is defined between an end cover, side walls of the accumulator housing and the separating element, and only contains gas or a combination of gas and liquid in the gas chamber.

15. A hydraulic accumulator, comprising:
    an accumulator housing having an end cover and having a gas chamber and a liquid chamber in the accumulator housing coaxially arranged along a longitudinal axis of the accumulator housing, the end cover having a front side and a gas port extending through the end cover;
    a separating element in the accumulator housing separating the gas chamber from the liquid chamber; and
    first and second sight glasses fixedly mounted in the end cover of the accumulator housing on the front side of the end cover spaced laterally from the gas port with the first sight glass arranged to supply light to the separating element in the accumulator housing and with the second sight glass arranged to provide direct optical observation by human inspectors of the separating element in the accumulator housing in directions parallel to and laterally offset from the longitudinal axis, each of the first and second sight glasses having an exposed front surface facing an environment outside of the accumulator housing and extending perpendicular to the longitudinal axis.

16. A hydraulic accumulator according to claim 15 wherein the second sight glass comprises a fisheye lens.

17. A hydraulic accumulator according to claim 15 wherein the first and second sight glasses are located in first and second holes, respectively, extending in the end cover parallel to the longitudinal axis and are spaced by distances from an inner end surface of the end cover opposite the front surface of the end cover.

18. A hydraulic accumulator according to claim 17 wherein the distances are each at least twice a height of the respective sight glass in a direction parallel to the longitudinal axis.

* * * * *